(12) United States Patent
Tilley et al.

(10) Patent No.: US 6,285,928 B1
(45) Date of Patent: Sep. 4, 2001

(54) ONBOARD ATTITUDE CONTROL USING REACTION WHEELS

(75) Inventors: Scott W. Tilley, Belmont; Thomas J. Holmes, Portola Valley; Keith J. Reckdahl, Palo Alto, all of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/478,787

(22) Filed: Jan. 6, 2000

(51) Int. Cl.$^7$ .................................................. B64G 1/29
(52) U.S. Cl. .............................................. 701/13; 244/165
(58) Field of Search ..................... 701/13, 4, 14; 244/164, 165

(56) References Cited

U.S. PATENT DOCUMENTS

| | | | |
|---|---|---|---|
| 3,999,729 | 12/1976 | Muhlfelder et al. | 244/165 |
| 4,071,211 * | 1/1978 | Muhlfelder et al. | 244/165 |
| 5,020,745 | 6/1991 | Stetson, Jr. | 244/165 |
| 5,054,719 | 10/1991 | Maute | 244/164 |
| 5,058,835 | 10/1991 | Goodzeit et al. | 244/165 |
| 5,098,041 * | 3/1992 | Uetrecht | 244/164 |
| 5,130,931 | 7/1992 | Paluszek et al. | 364/459 |
| 5,201,833 | 4/1993 | Goodzeit et al. | 244/165 |
| 5,205,518 * | 4/1993 | Stetson, Jr. | 244/165 |
| 5,279,483 * | 1/1994 | Blancke et al. | 244/165 |
| 5,308,024 | 5/1994 | Stetson, Jr. | 244/165 |
| 5,452,869 * | 9/1995 | Basuthakur et al. | 244/164 |
| 5,556,058 * | 9/1996 | Bender | 244/171 |
| 5,826,829 * | 10/1998 | Holmes | 244/165 |
| 5,931,421 * | 8/1999 | Surauer et al. | 244/165 |
| 6,145,790 * | 11/2000 | Didinsky et al. | 244/164 |

* cited by examiner

Primary Examiner—Michael J. Zanelli
Assistant Examiner—Eric M Gibson
(74) Attorney, Agent, or Firm—Perman & Green, LLP

(57) ABSTRACT

An onboard attitude control system is constructed to utilize a four reaction wheel system having a reference axis, wherein at least three of the reaction wheel spin axes are oriented obliquely to the reference axis. Current attitude is estimated based on uploaded orbital data, onboard sensed earth and sun position data, and attitude data sensed by a three axes gyroscope system. Current attitude is compared to mission attitude to calculate an error which is transformed to a trihedral axes adjustment command to actuate the reaction wheel system.

4 Claims, 4 Drawing Sheets

ONBOARD ATTITUDE CONTROL USING REACTION WHEELS

BACKGROUND OF THE INVENTION

The system of this application is designed to control the attitude of a satellite. Satellites must be maintained in a predetermined orbit and attitude in order to accomplish the assigned mission which can be surveillance, photography, detection and many others. The orbit and attitude of the satellite must be periodically adjusted to compensate for disturbances which occur in space or for the purpose of changing the mission.

In general, spacecraft attitude is adjusted by activating actuators, such as, momentum wheels, magnetic torguers, or thrusters in response to an attitude correction signal. The attitude error may be sensed by reference to sensors monitoring the position of the sun, stars and earth relative to the satellite or by onboard inertial sensors such as gyroscopes. The attitude is adjusted to its mission orientation in which the system is pointed at its predetermined target and is maintained in this orientation during orbital flight. During flight the satellite is subject to motions induced by external forces, on board mechanisms or other sources and the attitude control system must continuously monitor and adjust attitude. Attitude control is therefore of primary importance in order to point the satellite to accomplish its mission and to maintain that position with the required accuracy.

It is a purpose of this invention to use fuel efficient reaction wheels to achieve attitude corrections wherever possible. This is accomplished while obtaining a tighter pointing capability with increased spacecraft autonomy. It is a purpose of this invention to utilize four reaction wheels preferably arranged in a trihedral configuration to provide better performance and enhanced redundancy.

SUMMARY OF THE INVENTION

The control system of this invention employs a configuration of four reaction wheels preferably arranged in a trihedral relation as the primary attitude adjustment mechanism. The primary attitude sensors consist of a three axis gyroscope system. The control module includes stored orbital and related sun ephemeris data and appropriate estimating algorithms. The attitude is estimated with reference to the output of the three axis gyroscope system. Compensation for errors relating to gyroscope drift are provided by reference to data from on board earth and star sensors. Utilizing this data, the control module provides an estimate of the actual attitude of the satellite. The estimated attitude is compared to the desired attitude to obtain an attitude adjustment in terms of the three axis reference system. Each of the components of the adjustment is transformed to obtain the four wheel torque rates required to accomplish the adjustment. In order to further refine the estimated adjustment, the predicted three axis torque adjustments are fed back to the control module.

DESCRIPTION OF THE DRAWING

The invention of this application is described in more detail below with reference to the Drawing in which.

DESCRIPTION OF THE PREFERRED EMBODIMENT

Figure 1:
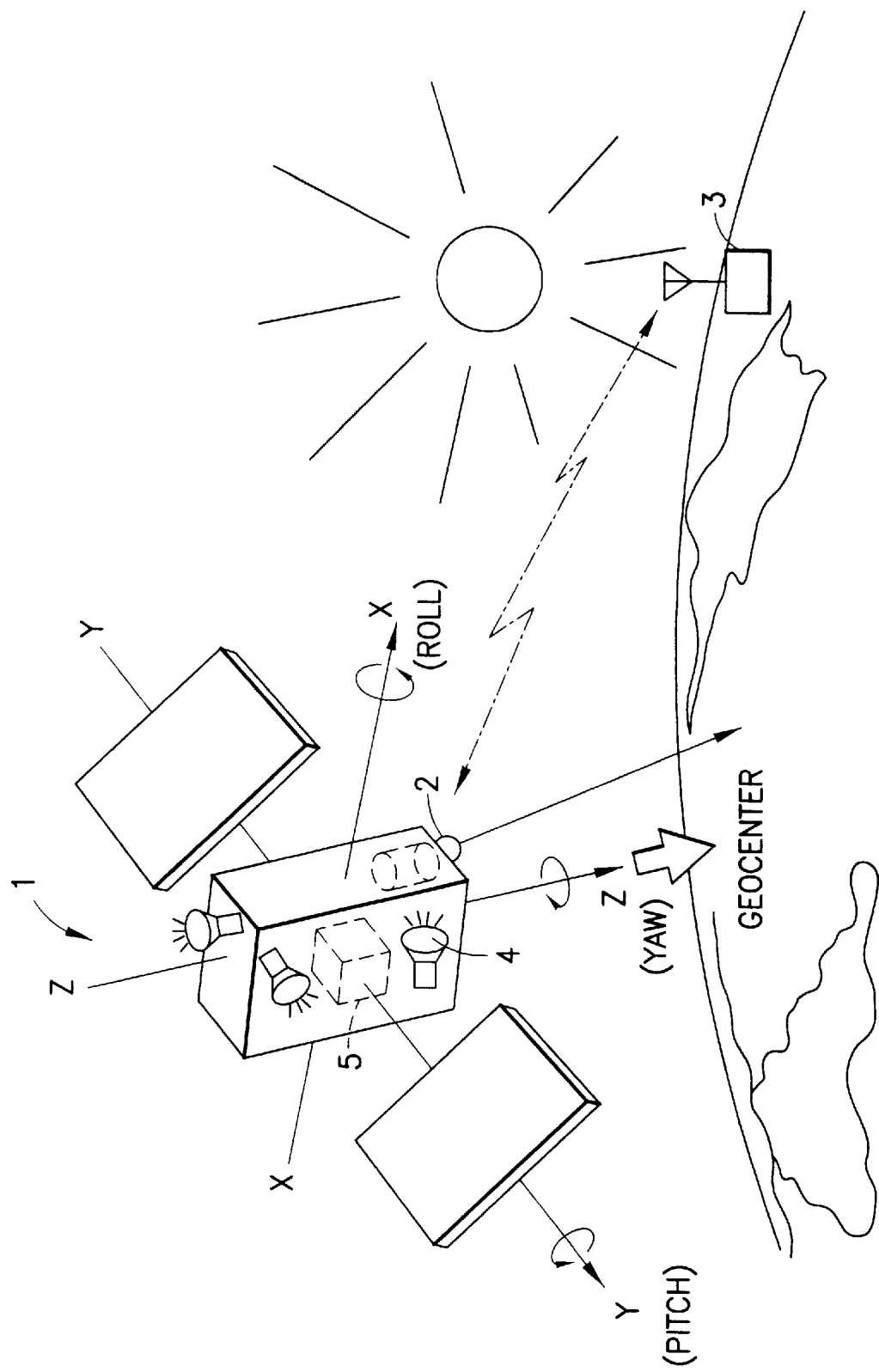
FIG. 1 is a schematic illustration of a satellite system using this invention.
Figure 3:
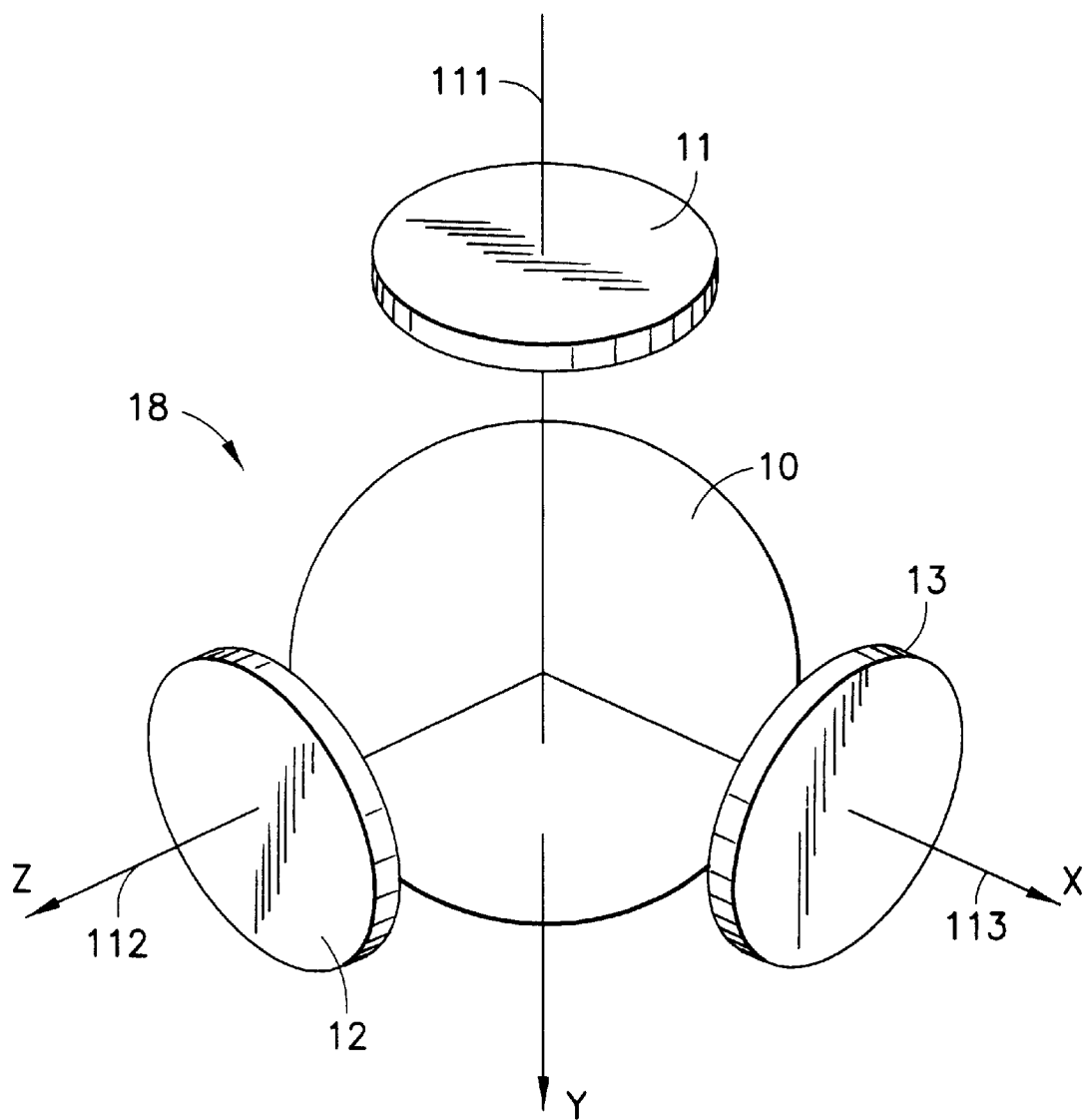
FIG. 3 is a schematic illustration of the trihedral reaction wheel configuration of this invention.

The basic components of the satellite 1 are shown in FIG. 1 and include mission sensors 2, ground control computer 3, attitude adjustment actuators 4, and onboard computer 5. Ground control computer 3 is in microwave communication with the satellite computer 5 and transmits the attitude data required to fulfill the mission for storage in computer 5. The mission sensors 2 may include cameras, telescopes, communications antennae and other similar devices. The attitude adjustment actuators 4 are shown schematically as thrusters, but may also include other types of actuators, such as thrusters, momentum wheels, or magnetic torquers. In particular a system of reaction wheels 18, as shown in FIG. 3, are used to supplement the thruster system. The thrusters 4 may be used for orbit transfer maneuvers, while the reaction wheel system 18 is used for smaller station keeping adjustments.

The satellite 1 is oriented in space by reference to three axes orthogonal coordinates. As shown in FIG. 1, the coordinate system includes an x axis which is generally tangent to the orbit path and referred to as the roll axis, a z axis which is generally pointed at the center of the earth and referred to as the yaw axis, and a y axis which is perpendicular to the other axes and referred to as the pitch axis. Pitch, yaw, and roll refer to rotational movement of the satellite about the particular axis.

Figure 2:
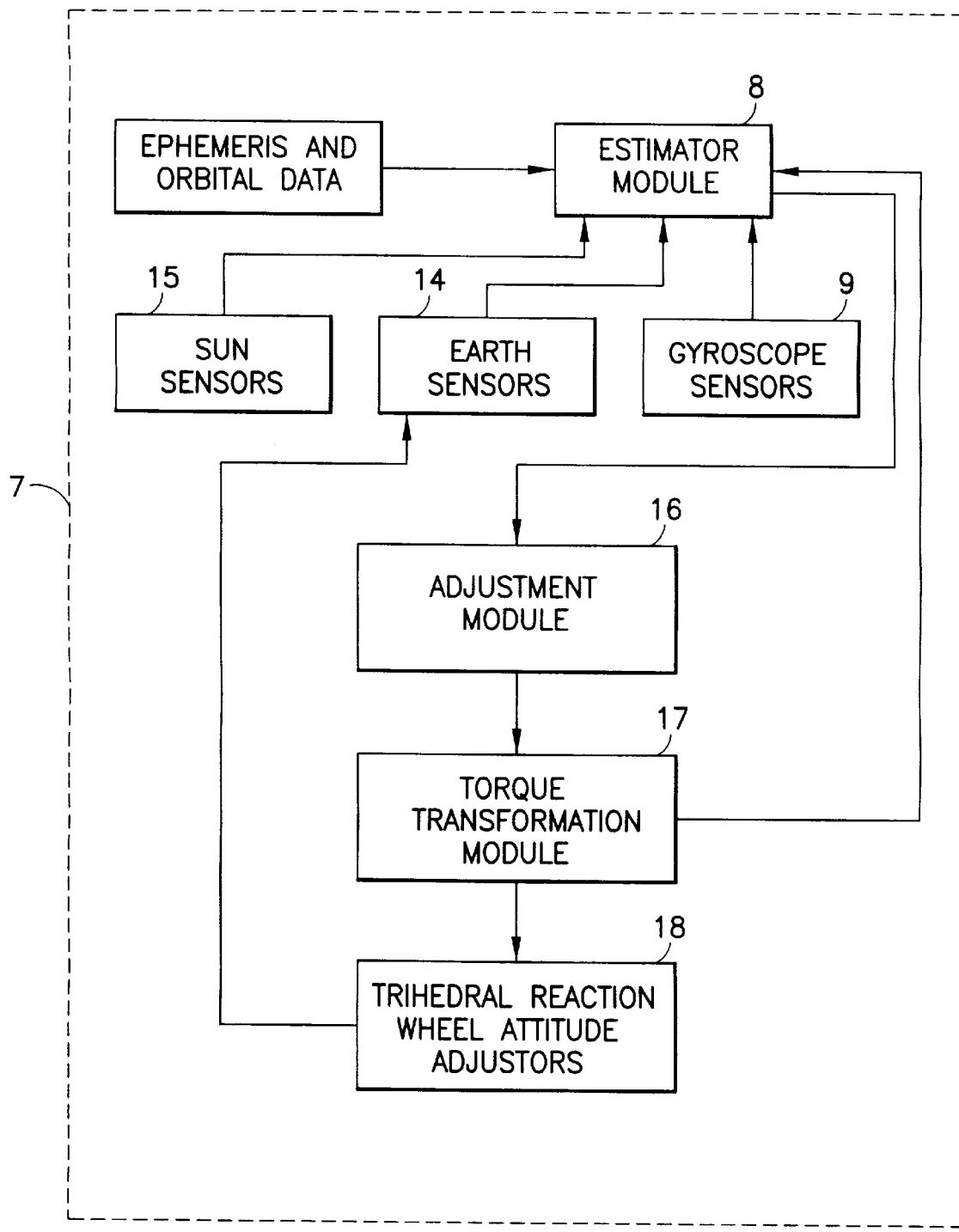
FIG. 2 is a block diagram of the system of this invention.

In order to maintain the desired mission attitude a continuous monitoring of actual attitude needs to be accomplished. For this purpose an onboard attitude control module 7 is constructed as part of the satellite control computer 5. A block diagram of the attitude control module 7 is shown in FIG. 2. The estimator module 8 contains modeling software which is capable of estimating the actual attitude of the satellite 1 from data sensed on board. Ephemeris and orbital data is up loaded and stored in the attitude control module 7 to allow the modeling software to take into consideration repetitive error causing disturbances. The primary source of sensed attitude data is a three axis gyroscope assembly 9. The data sensed by the gyroscopes are fed to the estimator module 8 and used to obtain an updated attitude for the satellite 1. To allow the estimator module 8 to compensating for gyro drift, the position of the satellite 1 with respect to the earth and sun are sensed by earth sensors 14 and sun sensors 15 on the satellite 1. Data from these sensors are sent to the estimator module 8 and factored into the modeling calculations. The estimator module uses least-square estimation techniques to combine the gyro data with the earth sensor data and sun sensor data to estimate both spacecraft attitude and gyro drift.

The modeling software may be any of the available algorithms designed to calculate attitude from available data.

The desired mission attitude is periodically up loaded from ground control computer 3 and stored in the attitude control module 7. The estimated actual attitude is compared to the mission attitude by the adjustment module 16 and an error calculation is obtained. This error calculation is converted to an attitude adjustment with components referencing the standard coordinate system. These data is converted by algorithms in the torque transformation module 17 to a four axis adjustment for actuating the four wheel actuator system 18. The latter transformation is accomplished as described in U.S. Pat. No. 5,826,829, which issued on Oct. 27, 1998, the contents of which are incorporated herein by reference.

The trihedral momentum bias (TMB) wheel configuration of the invention uses four wheels of which any three can be used to provide the momentum bias and active nadir attitude three axis pointing. The four wheels are comprised of one momentum wheel and three reaction wheels. The three reaction wheels (typically smaller than the momentum wheel) are in a trihedral configuration which can provide the backup momentum bias should the momentum wheel fail. Full three-axis control would also be maintained if any one of the reaction wheels should fail. The wheel system can be operated in any of five modes: one using all four wheels and four modes each of which turn off one of the four wheels. It is up to the user which of five available wheel combinations will be used for nominal operation. If the three reaction wheels are used for nominal operations. and the reaction wheels are sized properly, it is possible to achieve three-axis active attitude control without any wheels being required to spin through zero rpm.

The trihedral wheel system 18 includes a relatively large momentum wheel 10 mounted on the satellite, which wheel is rotatable about a spin axis (not shown) for maintaining gyroscopic stiffness of the spacecraft in space about a first axis.

The wheel system 18 also includes a plurality of relatively smaller reaction wheels 11, 12, and 13 which, like the momentum wheel 10, are mounted on the spacecraft and rotatable on spin axes 111, 112, and 113, respectively, in a fixed, trihedral, configuration. Any two of the three reaction wheels 11–13, together with the momentum wheel 10, provide full three-axis control of the spacecraft in a predetermined attitude. The reaction wheels are flywheels with a vehicle-fixed axis designed to operate through zero wheel speed. In the event of a failure of the momentum wheel 10, the reaction wheels 11, 12, and 13 can be used to provide angular momentum sufficient to maintain the gyroscopic stiffness lost by the failure of the momentum wheel, while maintaining full three-axis control of the spacecraft in a predetermined attitude. Further, in the event of a failure of any of the wheels, the combined angular momentum of the remaining wheels is effective to maintain gyroscopic stiffness about the first axis while also maintaining full three-axis control of the spacecraft in a predetermined attitude. In short, the momentum wheel 10 and the reaction wheels 11, 12, 13 are all rotatable about relatively fixed spin axes 111, 112, and 113 in a configuration for together maintaining gyroscopic stiffness and for maintaining three-axis control of the spacecraft. The details of this configuration are described in the above cited patent which is incorporated herein.

Figure 4:
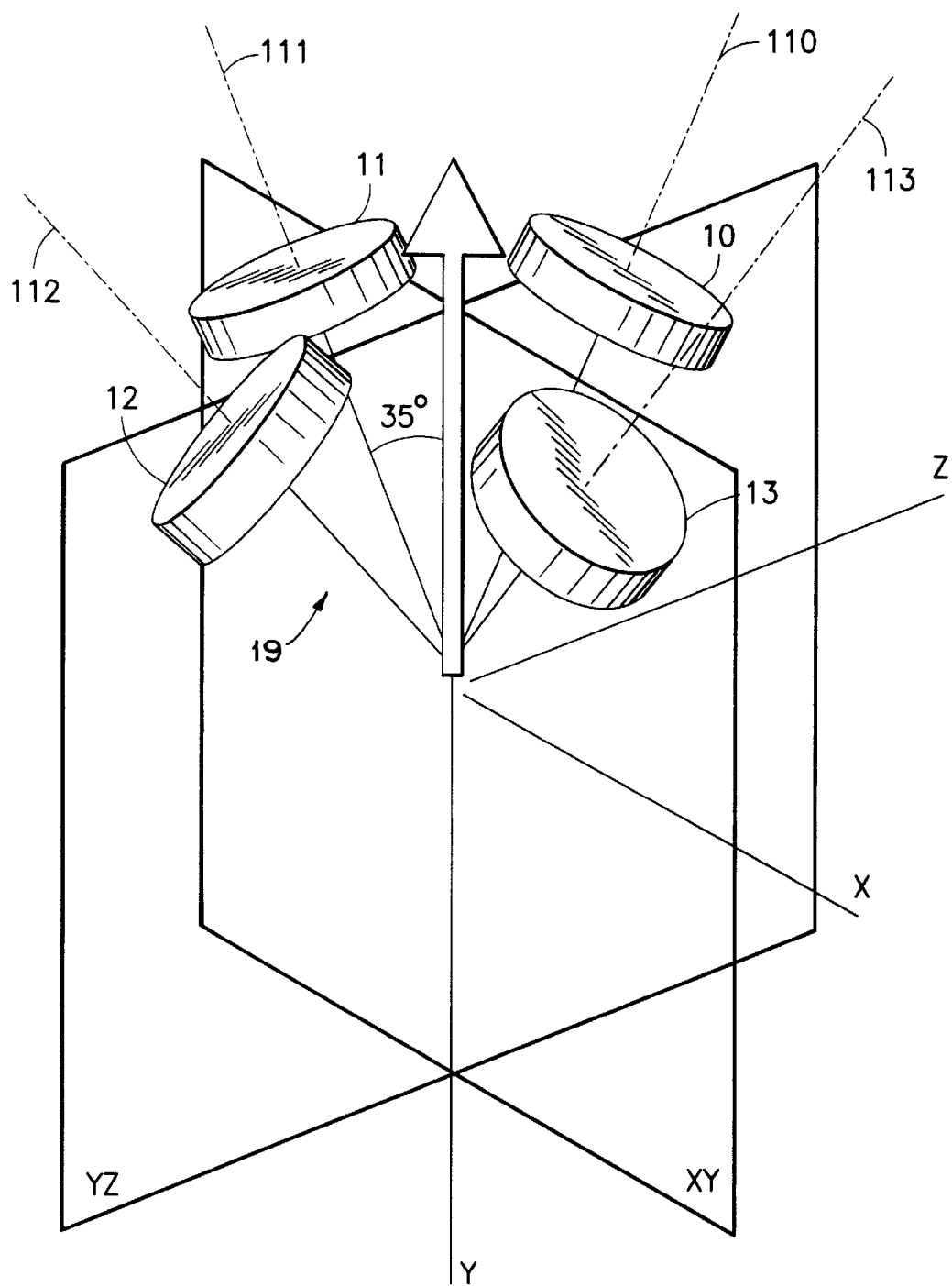
FIG. 4 is a schematic illustration of an alternative reaction wheel configuration used in this invention.

An alternative embodiment to the trihedral reaction wheel configuration, described above, is shown in FIG. 4. In this four wheel reaction wheel system 19, reaction wheels 10–13 are arranged with their spin axis 110 through 113 oblique to the y axis. As shown, the angle of each of the spin axes 110–113 is approximately 35°, but this could be virtually any angle depending on the amount of momentum bias needed for gyroscopic stiffness and the amount of momentum storage needed. Two of the spin axes are positioned in the yz plane and the other two spin axes are in the xy plane. Similarly to the trihedral configuration, the double V type of configuration also provides three axis control and three axis momentum storage by using any three of the four reaction wheels, while maintaining gyroscopic stiffness.

We claim:

1. A control system for maintaining the attitude of a satellite in alignment with its mission attitude comprising:
    a ground station control computer constructed to transmit satellite orbital data and mission attitude data to a satellite onboard computer;
    an earth sensor array on said satellite for sensing satellite position data relative to the earth;
    a sun sensor array on said satellite for sensing satellite position data relative to the sun;
    a three axis gyroscope system on said satellite for sensing satellite orbital position about a three axis coordinate system;
    a reaction wheel assembly having a reference axis, said wheel assembly including four wheels, each of said wheels being mounted for rotation on a spin axis, said spin axes arranged in a configuration, wherein at least three of said spin axes are oblique to said reference axis;
    an onboard satellite control computer constructed to receive and store input data comprising said orbital data and mission attitude data from the ground station computer and said sensed data from said onboard sensors, said onboard computer further comprising:
    an estimator module constructed to store orbital attitude modeling algorithms and to process the orbital data and mission attitude data, the sensed earth and sun position data, and the gyroscope attitude data and is further constructed to estimate the current satellite attitude based on said data inputs;
    an adjustment module constructed to compare the mission attitude to the estimated current attitude and to calculate an attitude error; said adjustment module further calculating an attitude adjustment capable of reducing the error to substantially zero; and
    a transformation module having algorithms stored therein for converting said attitude adjustment to an attitude command for actuating said reaction wheel assembly to adjust the attitude of the satellite according to the attitude adjustment.

2. A control system for maintaining the attitude of a satellite in alignment with its mission attitude, as described in claim 1, wherein one of said spin axes of said reaction wheels is the reference axis.

3. A control system for maintaining the attitude of a satellite in alignment with its mission attitude, as described in claim 1, wherein all of the reaction wheel spin axes are oblique to the reference axis.

4. In a satellite including a control system therefore, said control system including a ground station computer and a satellite onboard computer, a method of correcting the attitude of the satellite utilizing a reaction wheel assembly having a reference axis, said wheel assembly including four wheels, each of said wheels being mounted for rotation on an axis, said axes arranged in a configuration, wherein at least three of said axis are oblique to said reference axes, said method comprising the steps of:
    transmitting satellite orbital data and mission attitude data to the satellite onboard computer
    storing orbital attitude modeling algorithms in said satellite onboard computer,
    sensing satellite position data relative to the earth;
    sensing satellite position data relative to the sun;
    sensing satellite orbital position about a three axis coordinate system by means of a three axis gyroscope system;

estimating, in the onboard computer, the current attitude of the satellite based on said orbital data, said sensed earth and sun position data, and said gyroscope attitude data, using said attitude modeling algorithms;

comparing the mission attitude to the estimated current attitude and calculating an attitude error; and further generating an attitude adjustment based on said three axis coordinate system, capable of reducing the error to substantially zero;

storing transforming algorithms for converting said three axis attitude adjustment to said reaction wheel assembly in said onboard computer; and, transforming said three axis attitude adjustment to a four axis attitude command for actuating said reaction wheel system to adjust the attitude of the satellite according to the attitude adjustment.

* * * * *